United States Patent [19]

Maucher et al.

[11] 4,368,810

[45] Jan. 18, 1983

[54] FRICTION CLUTCH

[75] Inventors: Paul Maucher, Sasbach; Karl Keck, Leutesheim; Dieter Pretzel, Bühl, all of Fed. Rep. of Germany

[73] Assignee: Luk Lamellen und Kupplungsbau GmbH, Bühl, Fed. Rep. of Germany

[21] Appl. No.: 175,870

[22] Filed: Aug. 6, 1980

[30] Foreign Application Priority Data

Aug. 7, 1979 [DE] Fed. Rep. of Germany ....... 2932009

[51] Int. Cl.³ ...................... F16D 13/69; F16D 13/74
[52] U.S. Cl. ............................ 192/70.28; 192/70.12; 192/70.25; 192/109 R
[58] Field of Search ............. 192/113 B, 89 B, 111 B, 192/70.25, 70.28, 98, 99 S, 99 A, 109 R, 107 C, 110 R, 70.12

[56] References Cited

U.S. PATENT DOCUMENTS

| 384,268 | 6/1888 | Nelson | 192/70.25 |
| 3,474,888 | 10/1969 | Carlson et al. | 192/113 B |
| 3,542,177 | 11/1970 | Ahlen | 192/113 B |
| 3,557,923 | 1/1971 | Nickell | 192/70.28 |
| 3,666,062 | 5/1972 | Riese | 192/70.28 |
| 4,085,835 | 4/1978 | Bailey | 192/113 B |

Primary Examiner—George H. Krizmanich
Attorney, Agent, or Firm—Kontler, Grimes & Battersby

[57] ABSTRACT

A wet friction clutch for automotive vehicles wherein the clutch plate between the flywheel and the pressure plate is assembled of two spaced-apart friction discs and a spacer disc therebetween. The friction discs are coupled to each other by leaf springs which prevent relative angular but allow relative axial movements of the two friction discs. Additional leaf springs connect the spacer disc and the pressure plate to the cover, and elastic lamellae are used to couple the two friction discs to the flywheel and the pressure plate, respectively. The clutch plate drives the input shaft of the transmission and carries a distributor for lubricating coolant which is supplied by a tubular guide for the disengaging unit and serves to cool the friction discs.

39 Claims, 2 Drawing Figures

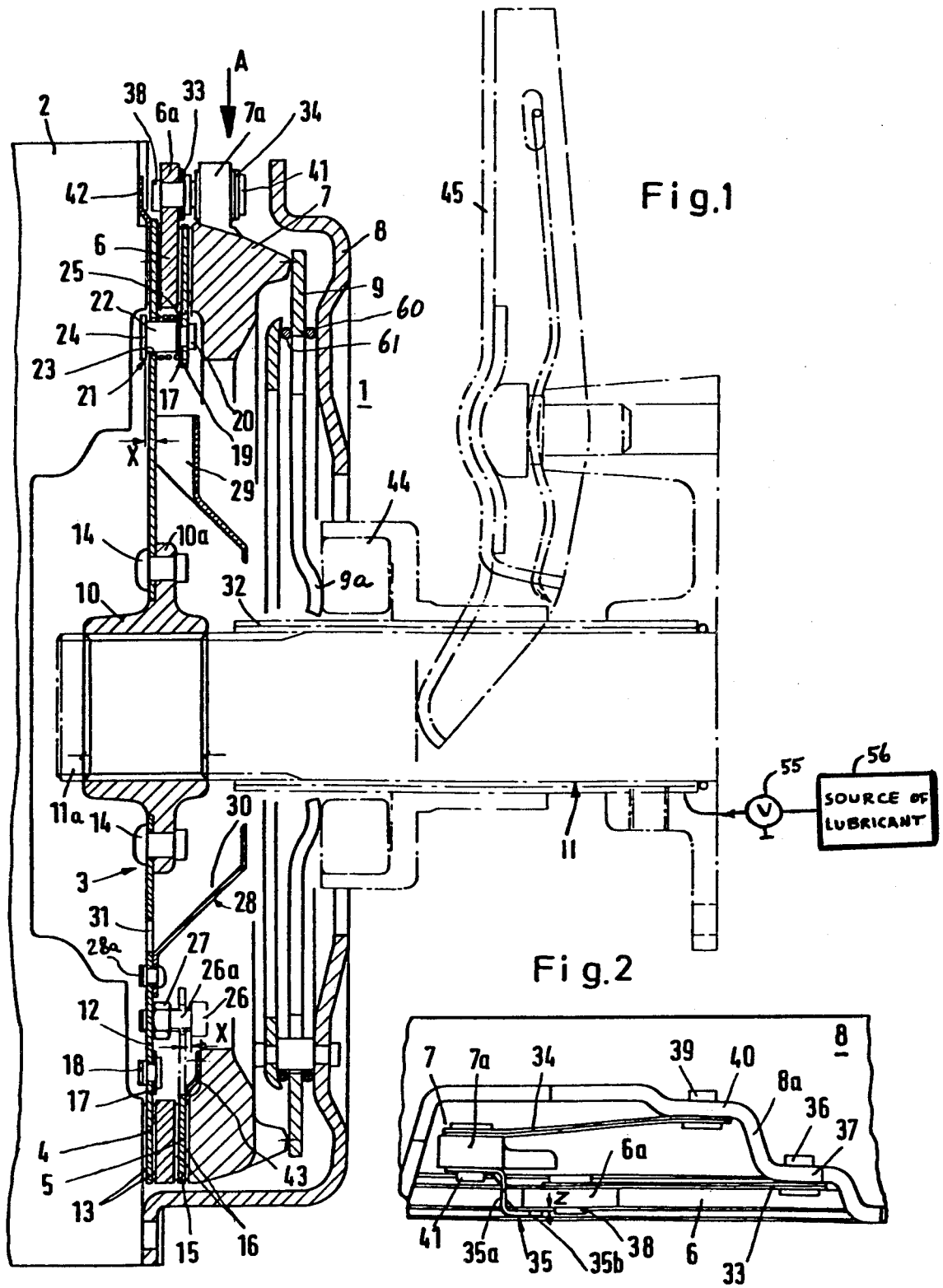

FRICTION CLUTCH

BACKGROUND OF THE INVENTION

The present invention relates to friction clutches in general, and more particularly to improvements in friction clutches which can be utilized in automotive vehicles, for example, to transmit torque from a flywheel or an analogous driving member which is rotated by the engine to the rotary input shaft of the transmission or an analogous driven member. Still more particularly, the invention relates to improvements in friction clutches of the type wherein at least one clutch plate is movable axially of but cannot perform angular movements with respect to a rotary component, such as the aforementioned input shaft.

It is already known to provide a friction clutch for automotive vehicles with a clutch plate having a disc-shaped intermediate pressure plate flanked by two friction discs which are movable toward and away from each other, i.e., toward or away from the respective sides of the intermediate pressure plate. The first friction disc is disposed between the flywheel and the intermediate pressure plate, the second friction disc is disposed between the intermediate pressure plate and a main pressure plate, and the latter can be biased by a clutch spring so that, when the clutch is engaged, the main pressure plate urges the second friction disc against the intermediate pressure plate which, in turn, urges the first friction disc against the rotating flywheel or an analogous driving member. The clutch spring is normally a Belleville spring which is installed between two seats, one on the cover of the clutch and the other on the main pressure plate. Reference may be had to German Offenlegungsschrift No. 2,048,957 which discloses a friction clutch of the just outlined conventional design. The clutch serves to transmit torque to a shaft or another driven member which is provided with a hub having a radially outwardly extending flange. The flange is flanked by two motion transmitting discs which are fixedly connected to each other by rivets. The motion transmitting discs are further connected to and share the angular movements of the hub. Resilient means are interposed between the motion transmitting discs and the hub. The radially outermost portions of the motion transmitting discs carry friction discs one of which is fixedly riveted to the respective motion transmitting disc. The other friction disc is coupled to the respective motion transmitting disc by claw-shaped projections which extend into complementary recesses or sockets of the associated motion transmitting disc. The coupling including the just mentioned claws and sockets is such that the other friction disc has some freedom of axial movement with reference to but cannot move radially of the one friction disc. More specifically, both friction discs can move axially of but are held against any radial movement relative to the hub of the shaft.

The friction discs of the friction clutch which is disclosed in the aforementioned German publication flank an intermediate pressure plate and are disposed between a rotary flywheel and a main pressure plate. The latter can be urged against the adjacent friction disc by the clutch spring in response to termination of application of the clutch-disengaging force whereby the thus engaged friction disc bears against the intermediate pressure plate which urges the other friction disc against the flywheel. The two pressure plates include radially outwardly extending portions which project into suitably configurated recesses of the cover and are attached to the cover for angular movement therewith. The connections between the two pressure plates and the cover are such that the pressure plates are held against radial movement. The cover shares all angular movements of the flywheel.

The just described conventional friction clutch exhibits certain structural as well as functional drawbacks. Thus, the coupling including the claws in the other friction disc and the sockets in the associated motion transmitting disc is rather sensitive, the same as the connections between the two pressure plates and the cover. A certain play is invariably necessary in order to allow for assembly of the coupling and connections during assembly of the friction clutch. The play cannot be held to a highly desirable minimum for several reasons, such as extremely high cost of accurate machining and/or unavoidable tolerances irrespective of the accuracy of machining and/or other shaping operations. The play increases when the friction clutch is in use as a result of progressing wear upon the male and female component parts of the aforementioned coupling and connections when the clutch is in use. This, in turn, results in the generation of readily detectable noise. Another drawback of the just described conventional friction clutch is that it is not readily possible to ensure that each and every claw or an otherwise configurated male coupling or connecting member engages the respective female coupling or connecting member, i.e., the wear upon certain coupling or connecting members is more pronounced than that upon the other coupling or connecting members so that, even after relatively short periods of use, the extent of axial movement of friction discs relative to each other and/or the extent of movement of the two pressure plates relative to the cover deviates from an optimum value. Consequently, when the clutch is supposed to be disengaged, its component parts continue to transmit torque from the flywheel to the shaft with the result that the transmission cannot be shifted into a different gear. Moreover, even short intervals of idleness of the friction clutch can lead to deposition of rust on the complementary surfaces of the male and female components of the aforementioned coupling between the two friction discs as well as the connections between the two pressure plates and the cover. This phenomenon is known as fitting corrosion. Also, dust which develops as a result of wear upon the friction linings is likely to deposit on the complementary surfaces of the male and female coupling and/or connecting members after a relatively short period of use of the clutch. The dust is mixed with oil and moisture to form a viscous mass which causes the neighboring parts of the clutch to adhere to each other, especially under the action of heat which is generated in response to repeated engagement and disengagement of the clutch. It has been found that the just discussed viscous mass is likely to permanently bond certain parts of the clutch to the neighboring parts. This exerts adverse influence upon axial movability of the parts, i.e., certain parts (including the friction discs and the pressure plates) are either incapable of performing requisite axial movements or are held against any axial movement with the result that the clutch cannot perform its torque transmitting function or is altogether incapable of interrupting the transmission of torque when the need for such interruption arises.

OBJECTS AND SUMMARY OF THE INVENTION

An object of the invention is to provide a friction clutch with at least one novel and improved clutch plate between the flywheel and the main pressure plate.

Another object of the invention is to provide the clutch plate or plates with novel and improved means for maintaining the friction discs of the clutch plate or plates in predetermined positions and in a predetermined orientation with reference to each other.

A further object of the invention is to provide a friction clutch which ensures that the clutch plate is invariably separated from the flywheel when the clutch is disengaged.

An additional object of the invention is to provide a clutch of the above outlined character with novel and improved means for connecting the cover to the main pressure plate and to a portion of the clutch plate.

Another object of the invention is to provide a simple, compact and relatively inexpensive friction clutch for automotive vehicles or the like which is constructed and assembled in such a way that the friction discs of its clutch plate can be subjected to predictable and uniform lubricating action.

An ancillary object of the invention is to provide novel and improved means for coupling the friction discs to adjacent component parts of the friction clutch.

Another object of the invention is to provide the friction clutch with novel and improved means for preventing stray movements of its components in disengaged condition of the clutch and/or during movement of the main pressure plate to or from engaging position.

Still another object of the invention is to provide a friction clutch of the above outlined character which is less prone to malfunction as a result of penetration of impurities into or as a result of development of impurities in its interior than heretofore known friction clutches, which can stand long periods of use with a minimum of maintenance, and which can be used as a superior substitute for presently known friction clutches in automotive vehicles or the like.

The invention is embodied in a friction clutch, particularly in a friction clutch for automotive vehicles, which comprises, among other components, a rotary clutch plate including a pair of spaced-apart coaxial friction discs and a spacer disc between the friction discs, and means for coupling the friction discs to each other so that the friction discs share all rotary movements but are free to move axially with reference to each other. The coupling means preferably comprises a plurality of deformable coupling elements and means (e.g., rivets or analogous fasteners) for fixedly securing the coupling elements to the two friction discs. Each coupling element may comprise one or more springs, e.g., a leaf spring and a helical or coil spring, and the springs are preferably prestressed so as to urge the friction discs axially of and away from each other, i.e., away from the respective sides of the spacer disc.

The clutch preferably further comprises stop means which is or which are operative to limit the extent of axial movement of the friction discs away from each other in disengaged condition of the clutch, i.e., when the clutch plate is not urged against a rotary driving member (such as a flywheel) by the customary pressure plate of the friction clutch. The stop means is or can be adjustable so as to change the extent of axial movement of the friction discs with reference to each other. Such adjustable stop means may include one or more bolts meshing with one of the friction discs and extending with clearance through holes in the other friction disc. Nuts are used to lock the bolts in selected axial positions whereby the extent to which the other friction disc is movable away from the one friction disc is determined by the heads of the bolts. By loosening the nuts, the axial positions of the bolts can be changed to thereby change the extent of axial movability of the other friction disc with reference to the one friction disc and/or vice versa.

The novel features which are considered as characteristic of the invention are set forth in particular in the appended claims. The improved friction clutch itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary partly schematic axial sectional view of a friction clutch which embodies the invention; and FIG. 2 is a fragmentary end elevational view as seen in the direction of arrow A in FIG. 1.

DESCRIPTION OF THE PREFERRED EMBODIMENTS

Referring to the drawing in detail, there is shown a friction clutch 1 which can be installed in an automotive vehicle and serves to transmit torque from a rotary driving member 2 constituting the flywheel of the engine to a rotary driven member 11 which is the input shaft of a multi-speed transmission. The friction clutch 1 comprises a clutch plate 3 (also known as driven disk) which includes two friction discs 4, 5 and a spacer disc or intermediate pressure plate 6 between the discs 4, 5, a main pressure plate 7, a resilient means or clutch spring 9 (here shown as a Belleville spring with radially inwardly extending fingers 9a), and a housing or cover 8 which rotates with the flywheel 2. The clutch spring 9 normally reacts against the housing 8 and bears against the pressure plate 7 so that the latter urges the clutch plate 3 against the flywheel 2 whereby the flywheel rotates the shaft 11 which shares all angular movements of the clutch plate 3. The flywheel 2 cannot move axially of the clutch plate 3 and/or shaft 11.

The clutch plate 3 comprises a hub 10 which surrounds and is movable axially of a splined or toothed portion 11a of the transmission shaft 11 so that the shaft invariably rotates with the hub 10. A radially outwardly extending flange 10a of the hub 10 is fixedly secured to the radially innermost portion of a circumferentially complete plate-like carrier member 12 of the clutch plate 3 by several rivets 14 or analogous fastener means. The radially outermost portion of the carrier member 12 constitutes the friction disc 4 which is separated from the other friction disc 5 by the spacer disc or intermediate pressure plate 6. The two sides of the friction disc 4 are flanked by and secured to friction linings 13, and the two sides of the outer portion 15 of the disc 5 are flanked by and secured to friction linings 16.

In accordance with a feature of the invention, the friction discs 4, 5 of the clutch plate 3 are coupled to each other by several leaf springs 17 (portions of two of these springs are shown in FIG. 1) each of which is preferably prestressed so as to urge the discs 4, 5 axially of and away from each other. The means for securing the leaf springs 17 to the friction discs 4, 5 are such that these discs have a certain freedom of axial movement but cannot move angularly with reference to each other. In other words, the friction disc 4 shares all angular movements of the friction disc 5 and vice versa but the discs 4, 5 can move nearer to or away from each other, as considered in the direction of the common axis of the flywheel 2, clutch plate 3, pressure plate 7, clutch spring 9 and shaft 11. The means for fixedly securing the leaf springs 17 to the carrier member 12 (i.e., to the friction disc 4) comprises rivets 18 (one or more for each spring 17), and the means for fixedly securing the leaf springs 17 to the radially inwardly extending portions or tongues 19 of the portion 15 of the friction disc 5 comprises rivets 20 (one or more for each spring 17). The rivets 18 are not affixed to the friction disc 5, and the rivets 20 are not affixed to the friction disc 4. As mentioned above, the leaf springs 17 may be (and preferably are) installed in prestressed condition so as to urge the friction discs 4 and 5 away from each other, as considered in the axial direction of the flywheel 2 and shaft 11. Each leaf spring 17 may extend substantially tangentially of the carrier member 12.

The extent of axial movement of the friction discs 4 and 5 away from each other is determined by stops 21 (only one shown). Each of these stops forms part of one of the aforementioned rivets 20, i.e., of the means for fixedly securing the leaf springs 17 to the tongues 19 of the friction disc portion 15. To this end, the rivets 20 comprise axial extension (first portions) 22 which are relatively short cylinders extending through openings 23 in the disc 4 (i.e., in the carrier member 12) and having enlarged end portions or flanges 24 disposed between the friction disc 4 and the flywheel 2. The diameters of the openings 23 are greater than the diameters of cylindrical extensions 22 but smaller than the diameters of the flanges 24. When the clutch 1 is engaged, the axial clearance X between the flanges 24 and the respective side of the friction disc 4 equals or approximates half the extent of axial movement of the pressure plate 7 between its operative and inoperative portions in which the clutch plate 3 is respectively in frictional contact and out of contact with the flywheel 2.

It is preferred to provide several rivets 20, i.e., several stop means 21. If the number of stop means 21 exceeds two, they (and more particularly the rivets 20) can serve as a means for holding the friction disc 5 against any or against appreciable stray movements (runout) radially of the common axis of the flywheel 2 and shaft 11 when the clutch 1 is disengaged.

The leaf springs 17 constitute but one form of elastically deformable elements which can urge the friction discs 4, 5 away from each other and which couple these discs to each other in the aforedescribed manner, i.e., so that the friction discs 4, 5 share all angular movements but are free to perform limited axial movements relative to each other. FIG. 1 shows, by way of example, second coupling means including coil springs 25 (only one shown) which surround the cylindrical extensions 22 of the rivets 20 and urge the friction discs 4, 5 apart, the same as the prestressed leaf springs 17. The coil springs 25 can be used in addition to or as a substitute for the leaf springs 27 or vice versa. Moreover, the coil springs 25 can be used to perform the sole function of yieldably biasing the friction discs 4, 5 away from each other and the leaf springs 17 then perform the sole function of coupling the discs 4, 5 to each other in such a way that these discs share all angular movements but have a limited freedom of axial movement with respect to each other.

The stop means 21 (which are portions of the rivets 20) can be used alone and/or in combination with otherwise configured, constructed and/or assembled stop means, preferably with or instead of adjustable stop means which allow for regulation of the extent of axial clearance X, i.e., of the extent to which the friction disc 4 is movable axially of the friction disc 5 and/or vice versa. As shown in FIG. 1, adjustable stop means for the friction disc 4 and/or 5 may comprise bolts 26 and nuts 27. The externally threaded shanks or stems 26a of the bolts 26 extend into tapped bores (not referenced) of the carrier member 12 and further mate with nuts 27 which are caused to bear against the right-hand side of the carrier member 12, as viewed in FIG. 1. The clearance X between the heads of the bolts 26 and the right-hand side of the friction disc 5 (in engaged condition of the clutch 1) equals or approximates half the extent of axial movement of the pressure plate 7 between its operative and inoperative positions. The mounting of the nuts 27 is such that the adjustable stop means including such nuts and the respective bolts 26 is of self-locking nature, i.e., the nuts 27 can maintain the bolts 26 in selected axial positions to thereby determine the magnitude of the clearance X. It is clear that the shanks 26a of the bolts 26 can extend well beyond the left-hand side of the carrier member 12, as viewed in FIG. 1, to mate with additional nuts (not shown) which further reduce the likelihood of undesirable axial displacement of the bolts 26 when the clutch 1 is in use.

The clutch 1 of FIG. 1 is a friction clutch of the type which is cooled by the lubricant, normally oil, i.e., the clutch is a so-called wet clutch. In order to ensure more satisfactory distribution of lubricant, the clutch plate 3 preferably carries a suitably configurated lubricant intercepting or distributing device 28 which may consist of metallic sheet material and can be riveted (as at 28a) or otherwise fixedly and permanently or removably secured to the carrier member 12 (or directly to the hub 10 in a manner not shown in the drawing). The intercepting or distributing device 28 is provided with circumferentially extending profiled portions 29 and 30 in the form of undulations whose purpose is to enhance the uniformity of distribution of liquid lubricant upon the friction discs 4, 5 and/or their friction linings 13 and 16. It is clear that the number of undulate portions can be reduced to one or increased to more than two as well as that the intercepting or distributing device 28 can be replaced by or used in conjunction with other types of lubricant intercepting and distributing means. The radially outermost portion of the undulation 30 on the distribution device 28 is adjacent to one or more holes or aperture 31 which are formed in the carrier member 12 and permit the lubricant to flow toward the disc 4, i.e., to lubricate the friction linings 13 of the friction disc which is in direct torque receiving engagement with the flywheel 2 when the clutch 1 is engaged.

The device 28 intercepts lubricant which is admitted via pipe 32 surrounding the right-hand portion of the transmission shaft 11, as viewed in FIG. 1. The pipe 32 preferably constitutes a tubular guide for axial movement of a component part 44 of the clutch disengaging unit. It is preferred to provide a valve 55 or other suitable means which can interrupt the admission of lubricant from a source 56 to the clutch 1 via pipe 32 when the clutch is disengaged.

FIGS. 1 and 2 show that the pressure plates 6 and 7 are respectively connected with the cover 8 by additional coupling means here shown as including elastic elements in the form of leaf springs 33 and 34. The mode of connection is the same as in the case of the leaf springs 17, i.e., the pressure plates 6 and 7 cannot rotate with respect to but are movable, within limits, axially of the cover 8 and flywheel 2. FIG. 2 illustrates an abutment 35 which operates between the pressure plates 6, 7 and is effective when the pressure plate 7 is moved to disengaging position.

The leaf springs 33 and 34 are installed in recesses 8a which are provided in and close to the periphery of the cover 8. The springs 33 are fixedly secured to the portions 37 of the cover 8 by rivets 36, and the springs 33 are further fixedly secured to the portions 6a of the pressure plate 6. The portions 6a extend radially outwardly from the main section or portion of the pressure plate 6. Analogously, the leaf springs 34 are fixedly secured to the portions 40 of the cover 8 by rivets 39, and each leaf spring 34 is further fixedly secured to the corresponding portion 7a of the pressure plate 7 by a discrete rivet 41. The portions 7a extend radially outwardly beyond the main section of the pressure plate 7.

The abutments 35 include substantially Z-shaped brackets 35a each having a first outer portion or leg connected to the main pressure plate 7 by the respective rivet 41. The other outer portion or leg 35b of each bracket 35a is adjacent to the inner side of the respective portion 6a of the intermediate pressure plate 6. The brackets 35a determine the axial clearance Z between the pressure plates 6 and 7. The clearance Z approximates or equals the clearance X between the flanges 24 and carrier member 12 in engaged condition of the clutch 1.

The leaf springs 33 and 34 are installed in prestressed condition. The springs 33 bias the pressure plate 6 in a direction away from the cover 8, i.e., toward the flywheel 2, and the springs 34 bias the pressure plate 7 in the opposite direction, i.e, toward the cover 8 and spring 9. The prestressing or initial bias of the springs 34 is more pronounced than that of the springs 33; this ensures that, whenever the clutch 1 is disengaged, the main pressure plate 7 is in contact with the spring 9 and the intermediate pressure plate 6 contacts the abutments 35. This, in turn, guarantees that the pressure plate 6 is guided for axial movement with negligible or without any stray movement (runout) in the radial direction of the clutch.

FIG. 1 further shows auxiliary or supplemental yieldable coupling means acting between the flywheel 2 and friction disc 4 on the one hand, and between the main pressure plate 7 and the friction disc 5 on the other hand. These auxiliary coupling means respectively include elastic elements in the form of lamellae 42 and 43. The lamellae 42 urge the friction disc 4 axially of and away from the flywheel 2, and the lamellae 43 urge the friction disc 5 axially of and away from the pressure plate 7. The bias of the lamellae 42, 43 is less pronounced than the bias of the leaf springs 17 which couple the friction discs 4 and 5 to each other.

The unit for disengaging the clutch 1 includes the aforementioned component 44 which is a release bearing adapted to act against the radially inwardly extending fingers 9a of the spring 9 when a fork 45 is shifted in a direction to the left, as viewed in FIG. 1. This causes the spring 9 to pivot with reference to the seats 60, 61 and to move its peripheral portion away from the main pressure plate 7, i.e., toward the adjacent portion of the cover 8. As the peripheral portion of the spring 9 moves away from the adjacent portion of the main pressure plate 7, the prestressed leaf springs 34 move the pressure plate 7 away from the friction disc 5, i.e., in a direction toward the cover 8. In other words, the main pressure plate 7 follows the clutch spring 9 in a direction to the right, as viewed in FIG. 1. After the portion or leg 35b of the abutment 35 covers the distance Z (in an upward direction, as viewed in FIG. 2), the leg 35b moves the intermediate pressure plate 6 away from the friction disc 4 so that a clearance develops between the parts 4 and 6. Since the leaf springs 33 and 34 act in the opposite directions, and since the initial stressing of the springs 33 is much less pronounced than that of the springs 34, the springs 33 and 34 ensure that the main and intermediate pressure plates 7 and 6 are moved away from the respective friction discs 5 and 4, and the abutments 35 ensure that the pressure plate 6 is moved to a predetermined axial position without any or with negligible stray movement (runout) in the radial direction. The leaf springs 17 are fixedly connected to the friction discs 4 and 5, and these springs urge the discs 4 and 5 away from each other; therefore the discs 4 and 5 are out of contact with the respective sides of the intermediate pressure plate 6 as soon as the clutch 1 is disengaged. The extent of axial movement of the discs 4 and 5 away from each other equals the distance X, and such axial movement or further separation of the discs 4 and 5 under the action of the leaf springs 17 is terminated by the stops 21 or 26, 27. These stops ensure that the carrier 12, together with its friction disc 4, is held against any or against appreciable radial and/or other stray movement (runout) relative to the axis of the clutch 1.

As mentioned above, the coil springs 25 can be provided in addition to the leaf springs 17, for example, if the bias or initial stressing of the springs 17 does not suffice to move the friction discs 4 and 5 away from and to predetermined positions with reference to each other when the clutch 1 is disengaged. However, the springs 25 or 17 can be used alone. The lamellae 42 and 43 (whose bias is preferably less pronounced than that of the coupling springs 17 and/or 25) ensure that the two sides of the friction disc 4 are disengaged from the flywheel 2 and intermediate pressure plate 6, and that the two sides of the friction disc 5 are disengaged from the intermediate pressure plate 6 and main pressure plate 7 as soon as the clutch 1 is disengaged. This, in turn, guarantees that the flywheel 2 cannot transmit drag torque to the friction disc 4, that the disc 4 cannot transmit drag torque to the pressure plate 6 and/or friction disc 5, and that the carrier member 12 cannot transmit drag torque to the shaft 11 when the clutch 1 is disengaged.

Friction between the elastic elements (lamellae) 42 and 43 of the auxiliary coupling means on the one hand and the friction discs 4 and 5 on the other hand is very small. These elastic elements can be replaced by suitable adjusting means between the clutch plate 3 and the shaft 11. Such adjusting means is operative to move the clutch plate 3 away from the flywheel 2 in response to disengagement of the clutch 1. The extent of movement of the clutch plate 3 under the action of the just mentioned adjusting means (e.g., a helical spring which reacts against a shoulder or flange of the shaft 11 and bears against the hub 10 and/or carrier member 12 so as to move the clutch plate 3 in a direction to the right, as viewed in FIG. 1) preferably equals or approximates X/2 or Z/2. The spring of the adjusting means can pull or push the clutch plate 3 in a direction away from the flywheel 2.

An important advantage of the coupling means including the springs 25 and/or 17 is that they connect the friction discs 4 and 5 to each other without any frictional engagement with the friction discs, i.e., there is no friction between the springs 25 and/or 17 on the one hand and the friction discs 4, 5 on the other hand so that the provision of such coupling means does not entail any wear upon the friction discs and/or the generation of dust which could interfere with proper operation of the clutch. Wear upon the friction discs of the clutch which is disclosed in the aforementioned German Offenlegungsschrift No. 2,048,957 is attributable to relative movement between the surfaces of the male and female coupling members. Since the springs 25 and/or 17 urge the friction discs 4 and 5 away from each other, they ensure that the friction discs move away from the spacer disc or intermediate pressure plate 6 as soon as the clutch 1 is disengaged. Moreover, the springs 17 can transmit torque from the disc 4 to the disc 5 when the clutch is engaged. The stop means 21 and/or 26, 27 ensure that the friction discs 4 and 5 are held in predetermined axial positions with reference to each other and also with reference to other component parts when the friction clutch 1 is disengaged. Adjustable stop means (such as the stop means including the bolts 26 and nuts 27) are of particular advantage when the friction clutch employs two or more clutch plates.

The clutch plate 3 of FIG. 1 is a so-called undamped clutch plate. As explained above, the carrier member 12 of this clutch plate is integral with the friction disc 4, and the other friction disc 5 is simply a flat washer which is located opposite the friction disc 4, with the intermediate pressure plate 6 therebetween. The width of the friction disc 5, as considered in the radial direction of the clutch, equals or approximates the width of at least one of the respective friction linings 16. The provision of a clutch plate wherein one (5) of the friction discs is a simple flat washer contributes to simplicity and lower cost of the clutch. Such design of the clutch plate results in savings in material and reduces the mass and inertia of the clutch plate so as to allow for more rapid engagement or disengagement of the clutch and more rapid changes in the speed ratio of the transmission which includes the shaft 11. Moreover, a relatively lightweight clutch plate contributes to longer useful life of the transmission because the wear upon the transmission is reduced. Still further, the compactness of the clutch is enhanced as a result of the utilization of a very simple and space-saving clutch plate, especially as considered in the radial direction of the clutch.

The coupling means between the friction discs 4 and 5 further ensure that the washer-like disc 5 is held against any or against appreciable runout with reference to the carrier member 12 and its disc 4. All in all, coupling means which include elastically deformable elements and connect the friction discs 4 and 5 to each other exhibit a host of important advantages including simple transmission of torque from the disc 4 to the disc 5, absence of wear, freedom of necessary axial movement of the discs 4 and 5 relative to each other, absence of any stray movements (runout) of the disc 5, simplicity of construction, compactness, convenient lubrication of both friction discs, absence of generation of dust as a result of the provision of coupling means between the friction discs, reliable operation, rapid engagement or disengagement of the clutch, and rapid shifting of the transmission to another gear ratio.

The additional coupling means including the leaf springs 33 and 34 ensure that all component parts of the clutch constitute a unitary structure because the cover 8 (which is connected to the driving member or flywheel 2 in a customary way, not shown) carries the pressure plates 6 and 7. The feature that the rivets 41 carry the abutments 35 contributes to simplicity and compactness of the clutch. The feature that the bias of the springs 34 exceeds the bias of the springs 33 ensures that the pressure plate 7 is invariably in contact with the resilient means 9 when the clutch 1 is disengaged.

The improved clutch is further designed with a view to prevent any runout of the clutch plate 3 relative to the axially fixed flywheel 2 when the clutch 1 is disengaged or during engagement or disengagement of the clutch. This is attributable, in part, to the feature that the extent of axial movement of the clutch plate 3 in a direction away from the axially fixed driving member or flywheel 2 is fixed at all times.

As mentioned above, the improved clutch is preferably of the type known as wet clutch. The lubricant (normally oil) serves to cool the component parts of the clutch. The fact that oil tends to establish a bond between neighboring surfaces is of no consequence in view of the provision of various coupling means which employ elastic elements and thus ensure that the parts are moved to predetermined axial positions as soon as the clutch 1 is disengaged. Moreover, air can penetrate between the neighboring components of the clutch when the pressure plate 7 is moved in a direction away from the axially fixed flywheel 2 in order to effect disengagement of the clutch.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In a friction clutch, particularly for automotive vehicles, the combination of a rotary clutch plate including a pair of spaced-apart coaxial friction discs and a spacer disc therebetween; and torque transmitting means for coupling said friction discs to each other so that the friction discs share all rotary movements and are free to move axially relative to each other, said coupling means comprising a plurality of deformable coupling elements and means for fixedly securing each of said coupling elements to each of said friction discs.

2. The combination of claim 1, wherein each of said coupling elements comprises at least one spring.

3. The combination of claim 2, wherein said springs are leaf springs.

4. The combination of claim 2, wherein said springs are prestressed so as to urge said friction discs axially of and away from each other.

5. The combination of claim 1, further comprising stop means operative to limit the extent of axial movement of said friction discs away from each other.

6. The combination of claim 5, wherein said coupling elements are elastic and are arranged to urge said friction discs axially of and away from each other.

7. The combination of claim 5, wherein said stop means is adjustable so as to change the extent of axial movability of said friction discs away from each other.

8. The combination of claim 1, further comprising a rotary driving member coaxial with said clutch plate, a pressure plate coaxial with said clutch plate, said clutch plate being disposed between said driving member and said pressure plate, said pressure plate bearing against said clutch plate to urge the latter against said driving member in engaged condition of the clutch and the pressure plate being movable axially of and away from the clutch plate through a predetermined distance in response to disengagement of the clutch, and stop means operative to limit the extent of axial movement of said friction discs away from each other in disengaged condition of the clutch, the extent of axial movement of said friction discs away from each other being equal to or approximating one-half of said predetermined distance.

9. The combination of claim 1, further comprising a rotary driven member coaxial with said clutch plate, said clutch plate further comprising a rotary carrier member for one of said friction discs and said carrier member including an inner portion, as considered in the radial direction of said clutch plate, and further comprising a hub rotatable with and movable axially of said driven member and means for fastening said inner portion of said carrier member to said hub.

10. The combination of claim 9, further comprising a pair of friction linings for each of said friction discs, the friction linings of each pair being disposed at the opposite sides of and being secured to the respective friction discs.

11. The combination of claim 9, wherein said one friction disc is integral with and constitutes the outermost portion of said carrier member, as considered in the radial direction of said clutch plate.

12. The combination of claim 9, wherein the other of said friction discs is a flat washer.

13. The combination of claim 12, wherein said washer has radially inwardly extending portions and further comprising stop means for limiting the extent of axial movement of said friction discs away from each other in disengaged condition of the clutch, said stop means acting upon said portions of said washer.

14. The combination of claim 1, further comprising stop means for limiting the extent of axial movement of said friction discs away from each other in disengaged condition of the clutch, said stop means comprising rivets each secured to one of said friction discs and having a first portion extending with clearance through the other of said friction discs and an enlarged second portion adjacent to that side of said other friction disc which faces away from said one friction disc.

15. The combination of claim 1, wherein said coupling coupling elements are elastic, and further comprising stop means for limiting the extent of axial movement of said friction discs away from each other in disengaged condition of the clutch, said stop means forming part of said securing means.

16. The combination of claim 15, wherein said securing means includes first securing means for fixedly connecting said elastic elements to one of said friction discs and second securing means for fixedly connecting said elastic elements to the other of said friction discs, said stop means forming part of said second securing means.

17. The combination of claim 1, further comprising a rotary driven member coaxial with said clutch plate, means for connecting one of said friction discs to said driven member so that said clutch plate can transmit torque to said driven member, and means for holding the other of said friction discs against runout with reference to said driven member.

18. The combination of claim 17, wherein said holding means comprises stop means operative to limit the extent of axial movement of said friction discs away from each other in disengaged condition of the clutch.

19. The combination of claim 18, wherein said coupling elements are prestressed elastic elements arranged to bias said friction discs axially of and away from each other.

20. The combination of claim 1, further comprising a rotary driving member at one side of said clutch plate, a pressure plate at the other side of said clutch plate, resilient means for biasing said pressure plate against the clutch plate in engaged condition of the clutch, a cover overlying said pressure plate and arranged to rotate with said driving member, and first and second additional coupling means for respectively connecting said spacer disc and said pressure plate to said cover with freedom of axial movement relative to said driving member.

21. The combination of claim 20, wherein said additional coupling means include devices for holding said spacer disc and said pressure plate against angular movement with reference to said cover.

22. The combination of claim 20, wherein said additional coupling means include leaf springs.

23. The combination of claim 20, further comprising abutment means operative to move said spacer disc away from one of said friction discs in response to disengagement of the clutch.

24. The combination of claim 20, wherein said additional coupling means include elastic elements and the elastic elements of said first additional coupling means bias said spacer disc in a direction toward said driving member, the elastic elements of said second additional coupling means being operative to bias said pressure plate in a direction toward said resilient means.

25. The combination of claim 24, wherein the bias of the elastic elements of said second additional coupling means exceeds the bias of the elastic elements of said first additional coupling means.

26. The combination of claim 1, further comprising a rotary driving member coaxial with and disposed at one side of said clutch plate, said friction discs being movable axially of said driving member and further comprising means for holding said spacer disc against runout in disengaged condition of the clutch.

27. The combination of claim 26, wherein said holding means comprises abutment means for moving said spacer disc in a direction axially of and away from said driving member in response to disengagement of the clutch.

28. The combination of claim 1, further comprising a rotary driving member at one side of said clutch plate, a pressure plate at the other side of said clutch plate, resilient means for biasing said pressure plate against said clutch plate in engaged condition of the clutch, a cover connected to said driving member and overlying said pressure plate, and first and second additional coupling means for respectively connecting said spacer disc and said pressure plate to said cover, said cover having recesses for portions of said first and second additional coupling means.

29. The combination of claim 28, wherein said cover has a peripheral portion and said recesses are provided in said peripheral portion, each of said first and second additional coupling means comprising elastic elements and further comprising rivets securing said elastic elements to said cover.

30. The combination of claim 29, wherein said cover is secured to and is coaxial with said driving member, said resilient means and said pressure plate being confined between said cover and said driving member to constitute therewith a self-supporting unit.

31. The combination of claim 1, further comprising means for lubricating said clutch plate.

32. The combination of claim 31, wherein said lubricating means is arranged to circulate a liquid cooling lubricant.

33. The combination of claim 1, further comprising a rotary driving member coaxial with and disposed at one side of said clutch plate, a rotary pressure plate coaxial with and adjacent to the other side of said clutch plate, one of said friction discs being immediately adjacent to said rotary member and the other of said friction discs being immediately adjacent to said pressure plate, and further comprising first auxiliary coupling means for connecting said driving member with the respective friction disc and second auxiliary coupling means for connecting said pressure plate with the respective friction disc.

34. The combination of claim 33, wherein each of said auxiliary coupling means includes elastic elements, the elastic elements of said first auxiliary coupling means being arranged to bias said one friction disc away from said driving member and the elastic elements of said second auxiliary coupling means being arranged to bias said other friction disc away from said pressure plate.

35. The combination of claim 33, wherein the elements of said first mentioned coupling means are spring means arranged to bias said friction discs axially of and away from each other with a force exceeding the bias of the elastic elements of said first and second auxiliary coupling means.

36. The combination of claim 1, further comprising a rotary driven element coaxial with said clutch plate and a hub axially movably mounted on said driven element, said clutch plate including carrier means connecting said hub with one of said friction discs and further comprising means for lubricating the clutch including a device for supplying liquid lubricant into the range of said carrier means and lubricant distributing means on said carrier means.

37. The combination of claim 36, wherein said distributing means includes undulations surrounding said driven element and being arranged to effect at least substantially uniform distribution of admitted lubricant to said friction discs.

38. The combination of claim 1, further comprising a rotary driving member coaxial with and disposed at one side of said clutch plate and means for lubricating the clutch including means for supplying lubricant to the other side of said clutch plate, said clutch plate having at least one aperture for admission of lubricant between said clutch plate and said driving member.

39. The combination of claim 1, further comprising means for supplying liquid lubricant to said clutch plate in engaged condition of the clutch and means for interrupting the admission of lubricant in response to disengagement of the clutch.

* * * * *